United States Patent
Hu et al.

(10) Patent No.: US 12,387,350 B2
(45) Date of Patent: Aug. 12, 2025

(54) NEURAL RADIANCE FIELD BASED CAMERA ALIGNMENT

(71) Applicant: GM GLOBAL TECHNOLOGY OPERATIONS LLC, Detroit, MI (US)

(72) Inventors: Yao Hu, Sterling Heights, MI (US); Binbin Li, Columbus, OH (US); Xinyu Du, Oakland Township, MI (US); Hao Yu, Troy, MI (US); Wende Zhang, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 105 days.

(21) Appl. No.: 18/544,677

(22) Filed: Dec. 19, 2023

(65) Prior Publication Data

US 2025/0200770 A1     Jun. 19, 2025

(51) Int. Cl.
*G06T 7/38* (2017.01)
*G05D 1/243* (2024.01)
(Continued)

(52) U.S. Cl.
CPC ............. *G06T 7/38* (2017.01); *G05D 1/2435* (2024.01); *G06T 7/337* (2017.01); *G06T 7/73* (2017.01); *G05D 2111/10* (2024.01); *G06T 2207/20084* (2013.01); *G06T 2207/30244* (2013.01); *G06T 2207/30252* (2013.01)

(58) Field of Classification Search
CPC ............. G05D 1/2435; G05D 2111/10; G06T 2207/20084; G06T 2207/30244; G06T 2207/3052
See application file for complete search history.

(56) References Cited

U.S. PATENT DOCUMENTS 11,399,531 B1 * 8/2022 Sibley ............... A01B 79/005
2019/0108651 A1 * 4/2019 Gu ..................... G06V 10/955
(Continued)

OTHER PUBLICATIONS

Yoonwoo Jeong, Seokjun Ahn, Christopher Choy, Animashree Anandkumar, Minsu Cho, Jaesik Park; Self-Calibrating Neural Radiance Fields; 2021 IEEE/CVF International Conference on Computer Vision. (ICCV).

(Continued)

*Primary Examiner* — Adnan M Mirza
(74) *Attorney, Agent, or Firm* — Quinn IP Law (57) ABSTRACT

A system includes a platform operational to move through an environment, a navigation system operational to measure platform poses of the platform in the environment, a camera operational to generate images of the environment at multiple timestamps, and a computer. The computer is operational to receive a first image from the camera, receive a second image from the camera, estimate a view direction of the first camera pose based on a first and second platform poses and alignment parameters, generate a rendered portion of the environment with a neural radiance field technique based on the second image and the alignment parameters, generate a predicted image of the environment as observed along the view direction through the rendered portion of the environment, determine differences between the first image and the predicted image, and update one or more of the plurality of alignment parameters based on the one or more differences.

20 Claims, 4 Drawing Sheets

(51) Int. Cl.
    *G06T 7/33*     (2017.01)
    *G06T 7/73*     (2017.01)
    *G05D 111/10*     (2024.01)

(56) References Cited

U.S. PATENT DOCUMENTS

2023/0230275 A1*    7/2023   Lin ........................ G06T 7/70
                                                                       382/103
2023/0256975 A1     8/2023   Li
2024/0371081 A1*   11/2024   Matthews ............... G06T 15/20

OTHER PUBLICATIONS

Li, Du, Hu, Yu, Zhang, Application filed with USPTO, System and Method for Performing a Camera To Ground Alignment for a Vehicle, U.S. Appl. No. 18/500,395, filed Nov. 2, 2023.
Koch, Zemel, Salakhutdinov; Siamese Neural Networks for One-shot Image Recognition; Proceedings of the 32nd international Conference on Machine Learning; 2015; Lille, France; JMLR: W&CP vol. 37; 8 pages.
Choi, Jung, Suhr; Automatic Calibration of an Around View Monitor System Exploiting Lane Markings; IITP-2018-0-00680; Sensors 2018, 18,2956; 26 pages.
Qin, Li, Shen; Vins-Mono: A Robust and Versatile Monocular Visual-Inertial State Estimator; arXiv:1708.03852v1 [cs.RO]; Aug. 12, 2017; 18 pages.

* cited by examiner

NEURAL RADIANCE FIELD BASED CAMERA ALIGNMENT

INTRODUCTION

The present disclosure relates to a system and a method for neural radiance field based camera alignment.

Camera-to-vehicle alignment is useful in vehicles for viewing, redundant lane sensing, and pedestrian detection. A forward-looking camera is usually attached high on a front end of a vehicle in a fixed relationship with the vehicle. The forward-looking camera often has a different coordinate system than the vehicle. Therefore, objects detected within the field of view of the forward-looking camera are offset relative to the vehicle coordinate system.

Accordingly, those skilled in the art continue with research and development efforts in the field of real-time camera-to-vehicle alignment detection.

SUMMARY

A system is provided herein. The system includes a platform, a navigation system, a camera, and a computer. The platform is operational to move through an environment. The navigation system is mounted to the platform, and is operational to measure a plurality of platform poses of the platform in the environment. The camera is mounted to the platform and is operational to generate a plurality of images of the environment at a plurality of timestamps. The computer is mounted to the platform, and is operational to receive a first image of the plurality of images from the camera. The first image is taken from a first camera pose relative to the environment at a first timestamp of the plurality of timestamps. The computer is further operational to receive a second image of the plurality of images from the camera. The second image is taken from a second camera pose relative to the environment at a second timestamp of the plurality of timestamps. The second timestamp is different than the first timestamp. The computer is further operational to estimate a view direction of the first camera pose based on a first platform pose of the plurality of platform poses at the first timestamp, a second platform pose of the plurality of platform poses at the second timestamp, and a plurality of alignment parameters of the camera relative to the platform; generate a rendered portion of the environment with a neural radiance field technique based on the second image and the plurality of alignment parameters; generate a predicted image of the environment as observed along the view direction through the rendered portion of the environment; determine one or more differences between the first image and the predicted image; and update one or more of the plurality of alignment parameters based on the one or more differences.

In one or more embodiments of the system, the generation of the rendered portion includes generation of an image-conditioned neural radiance field based solely on the second image. The generation of the predicted image is based on the rendered portion with a volume rendering of the image-conditioned neural radiance field.

In one or more embodiments of the system, the computer is further operational to determine one or more maneuver degeneracy conditions of the platform prior to utilizing the plurality of platform poses. The estimation of the view direction is further based on the one or more maneuver degeneracy conditions.

In one or more embodiments of the system, the computer is further operational to determine one or more image enabling conditions prior to utilizing the second image. The generation of the rendered portion is further based on the one or more image enabling conditions.

In one or more embodiments of the system, wherein the computer is further operational to determine one or more alignment parameters as a reduction of a loss function based on a plurality of differences between the first image and the predicted image.

In one or more embodiments of the system, the loss function is based on one or more of a color difference, a two-dimensional position difference of one or more pairs of features, and a maturation of multiple ones of the plurality of images within a time window.

In one or more embodiments of the system, the reduction of the loss function further includes aligning of a camera coordinate system of the camera with a platform coordinate system of the platform.

In one or more embodiments of the system, the reduction of the loss function includes a localization of the platform over multiple ones of the plurality of platform poses.

In one or more embodiments of the system, the platform forms part of one or more of a land vehicle, a water vehicle, and an air vehicle.

A method for neural radiance field based camera alignment is provided herein. The method includes measuring a plurality of platform poses of a platform in an environment with a navigation system; generating a plurality of images of the environment at a plurality of timestamps with a camera mounted to the platform; and receiving at a computer a first image of the plurality of images from the camera. The first image is taken from a first camera pose relative to the environment at a first timestamp of the plurality of timestamps. The method includes receiving at the computer a second image of the plurality of images from the camera. The second image is taken from a second camera pose relative to the environment at a second timestamp of the plurality of timestamps. The second timestamp is different than the first timestamp. The method further includes estimating a view direction of the first camera pose based on a first platform pose of the plurality of platform poses at the first timestamp, a second platform pose of the plurality of platform poses at the second timestamp, and a plurality of alignment parameters of the camera relative to the platform; generating a rendered portion of the environment with a neural radiance field technique based on the second image and the plurality of alignment parameters; generating a predicted image of the environment as observed along the view direction through the rendered portion of the environment; determining one or more differences between the first image and the predicted image; and updating one or more of the plurality of alignment parameters based on the one or more differences.

In one or more embodiments of the method the generating of the rendered portion includes generating an image-conditioned neural radiance field based solely on the second image. The generating of the predicted image is based on the rendered portion with a volume rendering of the image-conditioned neural radiance field.

In one or more embodiments, the method includes determining one or more maneuver degeneracy conditions of the platform prior to utilizing the plurality of platform poses. The estimating of the view direction is further based on the one or more maneuver degeneracy conditions.

In one or more embodiments, the method includes determining one or more image enabling conditions prior to utilizing of the second image. The generating of the rendered portion is further based on the one or more image enabling conditions.

In one or more embodiments, the method includes determining of one or more alignment parameters as a reduction of a loss function based on a plurality of differences between the first image and the predicted image.

In one or more embodiments of the method, the loss function is based on one or more of a color difference, a two-dimensional position difference of one or more pairs of features, and a maturation of multiple ones of the plurality of images within a time window.

In one or more embodiments of the method, the reducing of the loss function is aligning of a camera coordinate system of the camera with a platform coordinate system of the platform.

In one or more embodiments of the method, the reducing of the loss function includes localizing the platform over multiple ones of the plurality of platform poses.

A vehicle is provided herein. The vehicle includes a navigation system, a camera, and a computer. The navigation system is operational to measure a plurality of vehicle poses of the vehicle in an environment. The camera is operational to generate a plurality of images of the environment at a plurality of timestamps. The computer is operational to receive a first image of the plurality of images from the camera. The first image is taken from a first camera pose relative to the environment at a first timestamp of the plurality of timestamps. The computer is operational to receive a second image of the plurality of images from the camera. The second image is taken from a second camera pose relative to the environment at a second timestamp of the plurality of timestamps. The second timestamp is different than the first timestamp. The computer is further operational to: estimate a view direction of the first camera pose based on a first vehicle pose of the plurality of vehicle poses at the first timestamp, a second vehicle pose of the plurality of vehicle poses at the second timestamp, and a plurality of alignment parameters of the camera relative to the vehicle; generate a rendered portion of the environment with a neural radiance field technique based on the second image and the plurality of alignment parameters; generate a predicted image of the environment as observed along the view direction through the rendered portion of the environment; determine one or more differences between the first image and the predicted image; and update one or more of the plurality of alignment parameters based on the one or more differences.

In one or more embodiments, the vehicle includes circuitry coupled to the computer, and operational to utilize the plurality of alignment parameters and the plurality of images.

In one or more embodiments of the vehicle, the circuitry is operational to perform one or more automatic driving functions based on the plurality of alignment parameters and the plurality of images.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a system and a method for an online camera-to-vehicle alignment technique. The camera is generally mounted at a defined position of the vehicle at a fixed height above the ground. The alignment uses a neural radiance field (NeRF) technique and predicted images. A first image is acquired when the camera is at a first location and a first camera pose. A second image is acquired thereafter at a second location and a second camera pose. A one-shot neural radiance field technique uses the second image to create a three-dimensional volume of a portion of a space ahead of the camera and the vehicle. A volume rendering technique generates a two-dimensional predicted image from the three-dimensional volume.

Based on a global positioning system (GPS)/inertial measurement unit (IMU) of the vehicle, changes in an estimated view direction of the camera are estimated. The estimated view direction is based on alignment parameters of the camera to the vehicle. A predicted image is generated from the rendered space looking along the estimated view direction. The predicted image is compared with the first image to determine errors in the alignment parameters of the camera. The alignment parameters are subsequently updated to reduce the alignment errors.

Figure 1:
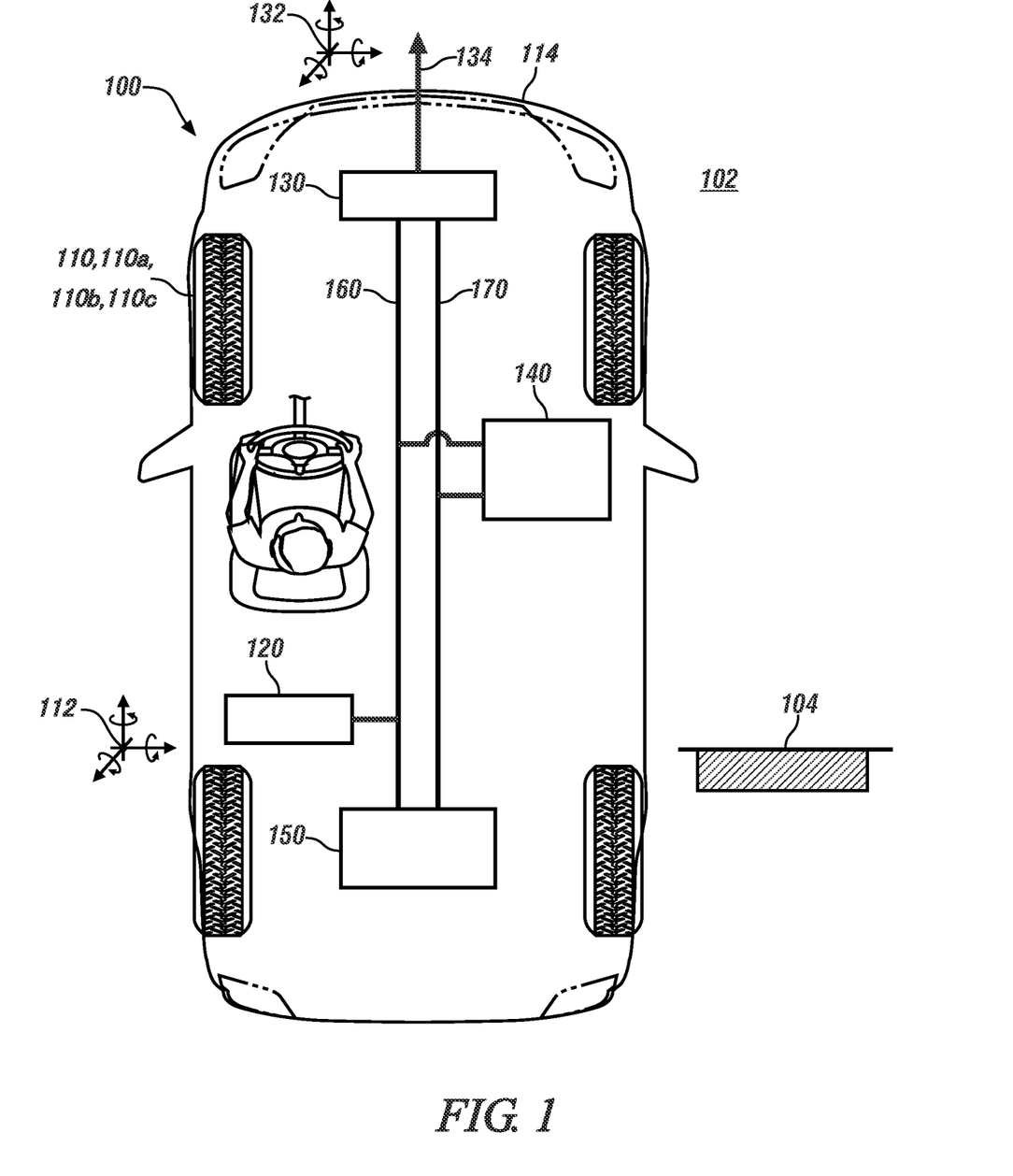
FIG. 1 is a schematic plan diagram illustrating a system for neural radiance field based camera alignment in accordance with one or more exemplary embodiments

Referring to FIG. 1, a schematic plan diagram illustrating a system 100 for neural radiance field based camera alignment is shown in accordance with one or more exemplary embodiments. The system 100 generally includes an environment 102, a ground 104, and a platform 110. The environment 102 may be an atmosphere through which the platform 110 moves. The ground 104 may be a roadway that the platform 110 rests upon, water that the platform 110 floats upon, and/or the Earth.

The platform 110 implements a moveable machine. The platform 110 may form part of a land vehicle 110a, an air vehicle 110b and/or a water vehicle 110c. The platform generally defines a platform coordinate system 112. The platform 110 generally includes a navigation system 120, a camera 130, a computer 140, and additional circuitry 150 in communication with each other via a communication bus 160. One or more optional dedicated links 170 may be included in the platform 110 to transfer low-latency and/or high-speed data.

The navigation system 120 implements a positioning system and inertial system. The navigation system 120 is rigidly mounted to the platform 110. The navigation system 120 is operational to measure a three-dimensional or a two-dimensional position of the platform 110 with respect to the ground 104. The position is reported on the communication bus 160. The navigation system 120 is also operational to measure a three-dimensional pose of the platform 110 relative to the ground 104 or environment 102. The pose is reported on the communication bus 160. In various embodiments, the positioning system includes a Global Positioning System 122. The Global Positioning System 122 provides geolocation and time information. Other positioning systems may be implemented to meet the criteria of a particular application. In some embodiments, the inertial system is an inertial measurement unit 124. An inertial measurement unit 124 is an electronic device that measures and reports force, angular rate, and sometimes orientation, using a combination of accelerometers, gyroscopes, and sometimes magnetometers. Other inertial systems may be implemented to meet the design criteria of a particular application.

The camera 130 implements a forward-looking camera sensor. In various embodiments, the camera 130 is rigidly mounted at or near a forward end 114 of the platform 110. In addition to the forward-looking camera 130, the platform 110 may have other cameras installed, such as left-side cameras, right-side cameras, rear cameras, etc. The coordinate systems of the other cameras may also be different than that of the platform (or vehicle) 110 and may be similarly aligned. The camera 130 and/or the other cameras may be installed at other positions of the platform 110 to cover other fields of view of the environment 102. The camera 130 is operational to capture a sequence of images of the environment 102 and/or the ground 104 around (e.g., ahead) of the platform 110 in a camera direction 134. The sequence of images may be associated with a sequence of poses and a sequence of positions of the platform 110. The images are referenced to a camera coordinate system 132. The camera 130 may be an optical camera that works in a visible spectrum and/or in a near infrared spectrum. In some embodiments, the camera 130 may include a high-speed shutter to limit blurring in the images due to movement of the platform 110. In various embodiments, the images may be reported on the communication bus 160. In other embodiments, the images may be transferred to the computer 140 and/or the additional circuitry 150 via dedicated links 170.

The computer 140 implements one or more processing circuits. The computer 140 is operational to receive the poses from the navigation system 120 and the sequence of multiple images from the camera 130. The sequence of images includes a first image taken from a first camera pose relative to the environment 102 at a first timestamp of multiple timestamps, and a second image taken from a second camera pose relative to the environment 102 at a second timestamp of the plurality of timestamps. The second timestamp is different (e.g., later) than the first timestamp. The timestamps are generated by the computer 140, the navigation system 120 and/or the camera 130. From the images, poses and positions, the computer 140 estimates a view direction of each pixel in the first camera pose based on (i) a first platform pose among multiple platform poses at the first timestamp, (ii) a second platform pose among the multiple platform poses at the second timestamp, and (iii) multiple alignment parameters of the camera 130 relative to the platform 110. The view direction may be in the coordinates of the given image. A rendered portion of the environment 102 is subsequently generated by the computer 140 using a neural radiance field technique based on the second image and the alignment parameters. The computer 140 subsequently generates a predicted image of the environment 102 as observed along the view direction through the rendered portion of the environment. One or more differences between the first image and the predicted image are calculated by the computer 140. One or more of the alignment parameters are updated based on the one or more differences.

In various embodiments, the computer 140 generally includes at least one microcontroller. The at least one microcontroller may include one or more processors, each of which may be embodied as a separate processor, an application specific integrated circuit (ASIC), a field programmable gate array (FPGA), or a dedicated electronic control unit. The at least one microcontroller may be an electronic processor (implemented in hardware, software executing on hardware, or a combination of both). The at least one microcontroller may also include tangible, non-transitory memory, (e.g., read-only memory in the form of optical, magnetic, and/or flash memory). For example, the at least one microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executable instructions may be a series of instructions employed to run applications on the at least one microcontroller (either in the foreground or background). The at least one microcontroller may receive commands and information, in the form of one or more input signals from various controls or components and communicate instructions to the other electronic components.

The additional circuitry 150 implements driver assistance circuitry. The additional circuitry 150 is operational to assist a driver of a vehicle 110a-110c in terms of speed and/or direction based on the images received from the camera 130 and the alignment parameters of the camera 130 relative to the platform 110. In some embodiments, the additional circuitry 150 may implement automatic braking functions that respond to obstacles appearing in the images ahead of a land vehicle 110a and subsequently slow and/or stop the land vehicle 110a. In other embodiments, the additional circuitry 150 may implement steering assistance functions that aid in maintaining the land vehicles 110a centered in traffic lanes on the ground 104. In still other embodiments, the additional circuits 150 may implement semi-automatic and/or autonomous driving functions. Other functions, such as perception, localization and/or mapping may be implemented in the additional circuitry 150 to meet the design criteria of a particular application. In other embodiments, the circuitry 150 and the computer 140 may be implemented as one hardware to perform the tasks.

The communication bus 160 implements a multi-node digital bus. The communication bus 160 is operational to transfer the position data and pose data from the navigation system 120 to the computer 140. In some embodiments, the communication bus 160 may also transfer the images from the camera 130 to the computer 140 and/or the additional circuitry 150. The alignment parameters of the camera 130 are transferred by the communication bus 160 from the computer 140 and the additional circuitry 150.

The dedicated links 170 implement wired cables and/or optical cables. The dedicated links 170 provide low-latency transfers of the images from the camera 130 to the computer 140 and/or the additional circuitry 150. In various embodiments, the dedicated links 170 may transfer data from the computer 140 to the additional circuitry 150.

Figure 2:
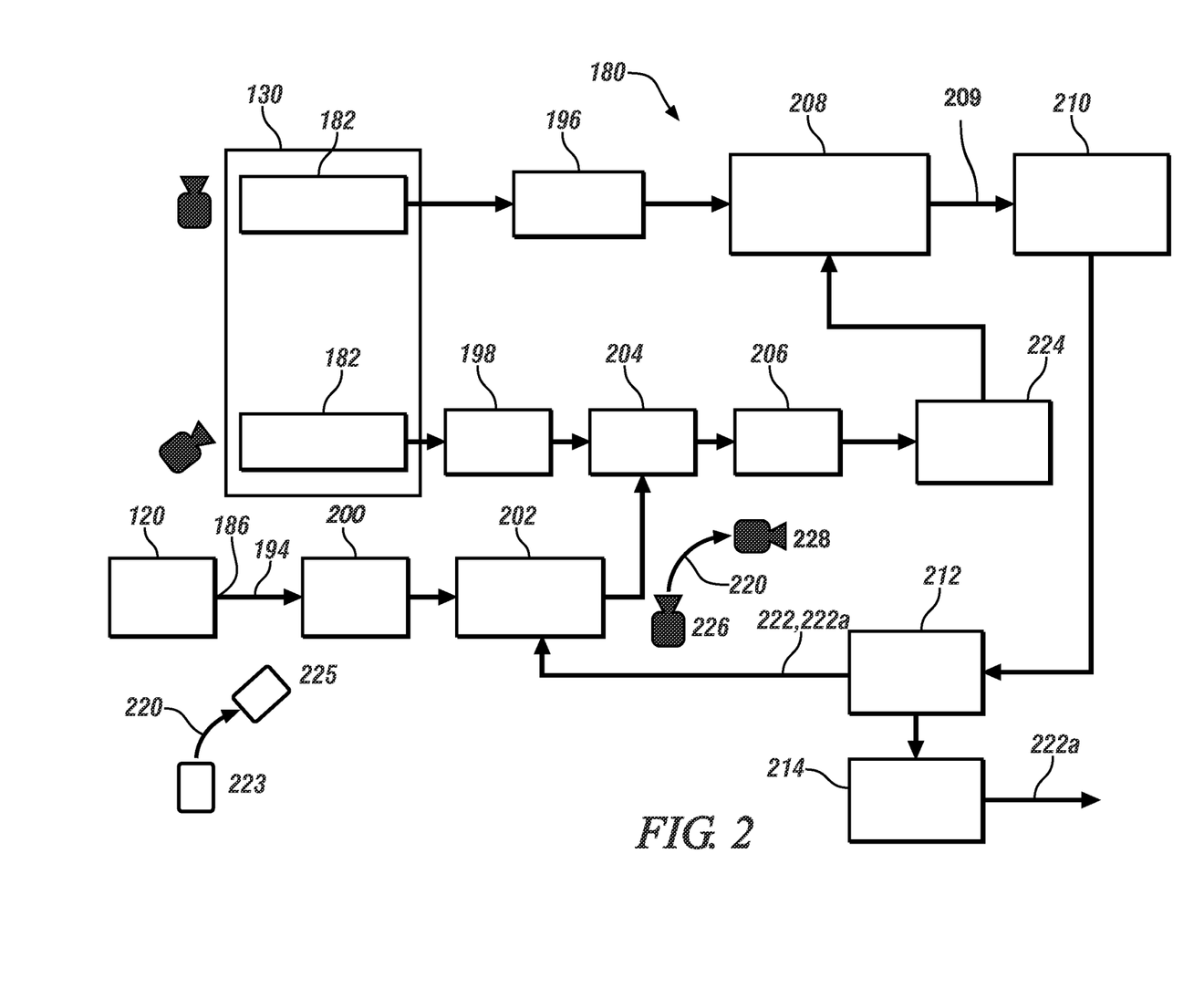
FIG. 2 is a functional flow diagram of operations within the system in accordance with one or more exemplary embodiments.

Referring to FIG. 2, with reference back to FIG. 1, a functional flow diagram of an example implementation of operations 180 within the system 100 is shown in accordance with one or more exemplary embodiments. The operations 180 receive as input data a first image 182, a second image 184, and dynamics 186 of the platform 110. The first image 182 and the second image 184 are received by the computer 140 from the camera 130. The dynamics 186 are transferred to the computer 140 from the navigation system 120. The dynamics 186 may include, but are not limited to, speed, location, direction, pose, and the like of the platform 110. The operations 180 generate output data (e.g., updated alignment parameters 222a). The output data/updated alignment parameters 222a includes the multiple parameters for camera-to-platform alignment. The output data/updated alignment parameters 222a is transferred to the additional circuitry 150. The operations 180 generally include steps 190-214, as illustrated. The sequence of steps is shown as a representative example. Other step orders may be implemented to meet the criteria of a particular application.

In the step 190, the computer 140 may receive the first image 182 from the camera 130. In the step 192, the computer 140 may receive the second image 184 from the camera 130. The first image 182 and the second image 184 may be fields or frames. The dynamics 186 (e.g., the speed, position, direction, and pose data) are received by the computer 140 from the navigation system 120 in the step 194.

The first image 182 is buffered within the computer 140 in the step 196. Multiple image enabling conditions of the second image 184 are checked in the step 198. The image enabling condition step 198 looks for sufficient image features (e.g., clarity and brightness) of the second image 184 to be usable for subsequent processing. If the second image 184 is too blurry, too dark and/or washed out (too bright), the second image 184 may be discarded and subsequent images are checked.

Current dynamics 186 of the platform 110 are checked by multiple motion enabling conditions in the step 200. The motion enabling condition step 200 determines if the current dynamics 186 represents realistic movements of the platform 110. In the example, the platform 110 may move 221 in location and change from a first platform pose 223 to a second platform pose 225. If the platform 110 has moved too far, too close, and/or too fast since a previous check, and/or rotated too far or too close in pitch, yaw (or direction), and/or roll to be usable (e.g., check for maneuver degeneracy conditions), the current dynamics 186 is discarded and subsequent dynamics is checked.

In the step 202, the computer 140 uses a change 220 in the pose data and uses multiple current (e.g., initial) alignment parameters 222 to calculate a view direction of a predicted image 224. The changes 220 in the pose data (e.g., changes in up to six dimensions) generally represents motion of the platform 110 from the first platform pose 223 at the first timestamp to a second platform pose 225 at the second timestamp. Combining the changes 220 and the alignment parameters 222 generally produces the camera pose changes, which represent the camera 130 from a first camera pose 226 associated with the first platform pose 223 at the first timestamp to a second camera pose 228 associated with the second platform pose 225 at the second timestamp. The view direction, as calculated, may be similar to or match the camera direction 134 while in the first camera pose 226 at the first timestamp. The camera pose changes are utilized in the step 204.

In the step 204, the computer 140 predicts an image-conditioned neural radiance field using a one-shot neural radiance field technique from the previously-enabled second image 184. The image-conditioned neural radiance field is used by the step 206 to generate a rendered portion of the environment 102. The rendered portion is a three-dimensional estimation of the environment 102 based solely on the second image 184. The predicted image 224 is an estimation of what the camera 130 may have recorded while pointed in the view direction into the environment 102 from the first camera pose 226 at the first timestamp. The predicted image 224 may be a field or a frame.

In the step 208, the first image 182 is read from the buffer and compared to the predicted image 224. The comparison generally seeks to minimize differences in six degrees of freedom 209 (e.g., pitch, roll, yaw, translation in an x direction (tx), translation in a y direction (ty), and translation in a vertical z direction (tz)) between the first image 182 and the predicted image 224. Existing techniques, such as Gauss-Newton minimization, may be used to minimize the differences between the two images. Other minimization techniques may be implemented to meet the design criteria of a particular application. The six difference values in the six degrees of freedom are used in the step 210.

In the step 210, the computer 140 uses the six difference values in the six degrees of freedom to update the alignment parameters 222 that were used to estimate the view direction in the step 202. The updated alignment parameters 222a are stored in a calibration memory within the computer 140 in the step 212. During a next pass through the step 202, the updated alignment parameters 222a are accessed from the calibration memory and used to generate the next view direction. In the step 214, the updated alignment parameters 222a are presented to the additional circuitry 150.

Figure 3:
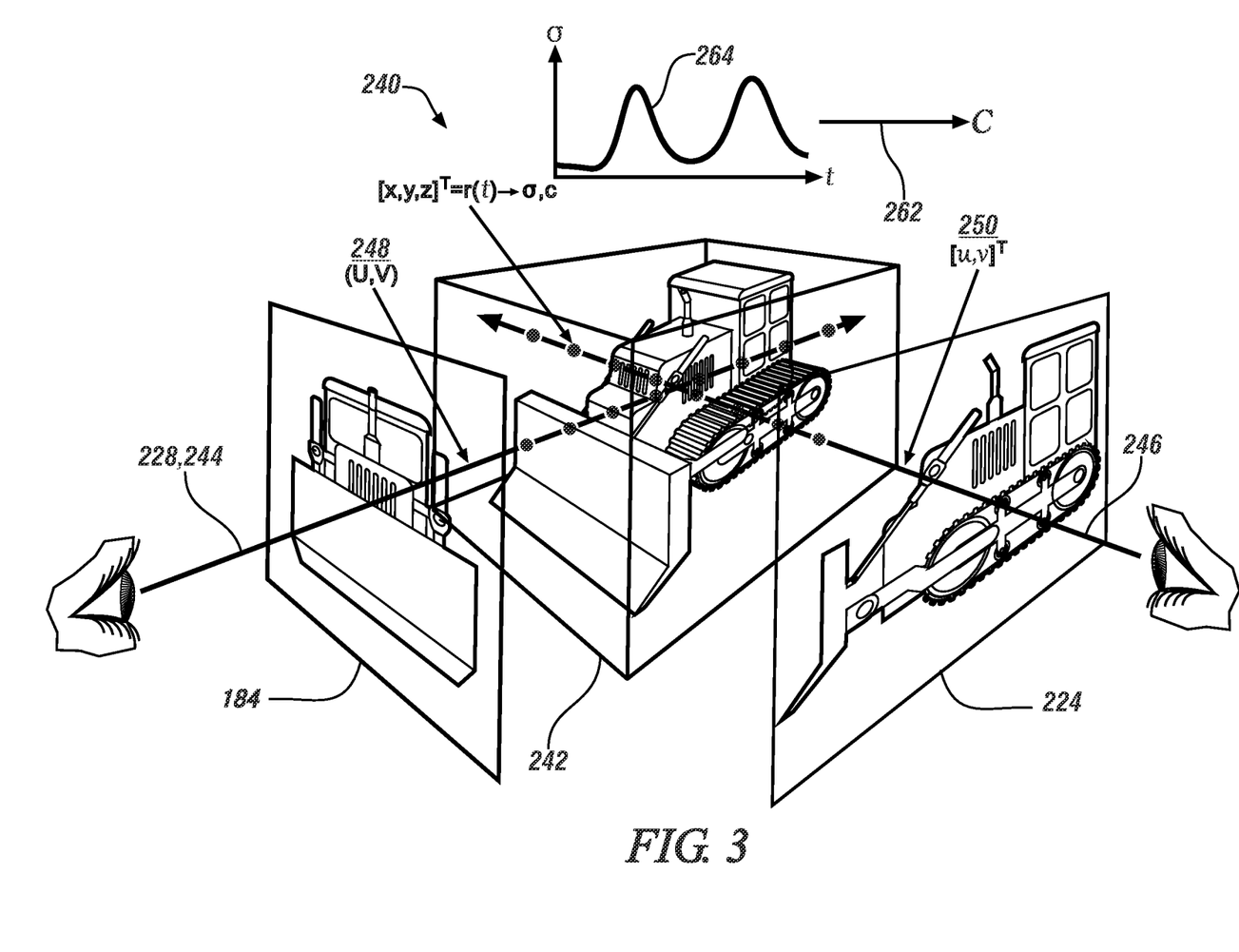
FIG. 3 is a perspective diagram of a rendered portion of an environment in accordance with one or more exemplary embodiments.

Referring to FIG. 3, with reference back to FIGS. 1 and 2, a perspective diagram 240 of an example rendered portion 242 of the environment 102 is shown in accordance with one or more exemplary embodiments. The diagram 240 illustrates a transformation of the second image 184 into the predicted image 224 as seen in the rendered portion 242 of the environment 102 looking along a vector d in the view direction 246. The transformation generally learns a neural radiance field from each original pixel (u,v) 248 on a corresponding ray 244 through the second image 184 captured at the second camera pose 228 and predict each pixel $[u,v]^T$ 250 on a corresponding vector d through the predicted image 224. The transformation is based on the neural radian field, which requires determination of vector d using a first transfer function $f_1$ as follows:

$$d = f_1(u, v; {}_p^e T_1, {}_p^e T_2, {}_c^p T)$$

Where vector d is the view direction 246, ${}_p^e T_1$ represents an initial pose of the platform (p) relative to the environment (e) the at the first timestamp $\tau_1$, ${}_p^e T_2$ represents a subsequent pose of the platform (p) relative to the environment (e) at the second timestamp $\tau_2$, and ${}_c^p T$ represents the alignment parameters of the camera (c) relative to the platform (p).

A second transfer function $f_2$ may establish a color (C) of the predicted pixel $[u,v]^T$ 250 in the predicted image 224 ($I_2$) by integrating 262 the density (a) and NeRF color (c) of the points (r(t)) at ray (r) with distances (t) along the vector d as follows:

$$C = f_2(d; I_2)$$

Where $I_2$ is the second image 184. An example curve 264 of the density σ varying as a function of ray distance t is illustrated in the figure.

Figure 4:
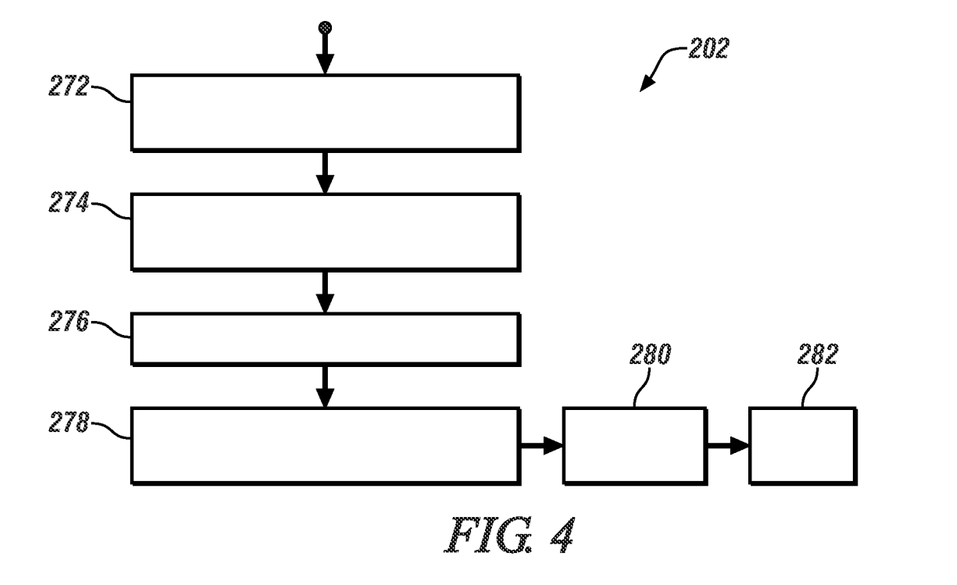
FIG. 4 is a flow diagram of a view direction estimation in accordance with one or more exemplary embodiments.

Referring to FIG. 4, with reference back to FIGS. 1 and 2, a flow diagram of an example implementation of the view direction estimation of the step 202 is shown in accordance with one or more exemplary embodiments. The flow diagram presents an example implementation of the transfer function $f_1$. The step 202 generally includes steps 272 to 282, as illustrated. The sequence of steps is shown as a representative example. Other step orders may be implemented to meet the criteria of a particular application.

In the step 272, the computer 140 receives from the navigation system 120 the platform poses 223, 225 (e.g., $^e_pT_1$, $^e_pT_2$) with respect to the environment 102 at the first timestamp and the second timestamp. The computer 140 calculates a camera relative pose from the first timestamp to the second timestamp in the step 274 as follows:

$$^{c_2}_{c_1}T = \left(^p_cT^e_pT_2\right)^{-1}\,^e_pT_1\,^p_cT$$

Where $^p_cT$ represents the camera to platform alignment parameters.

In the step 276, each pixel (u,v) in a second image coordinate is converted as follows:

$$[x, y, 1]^T = K^{-1}[u, v, 1]$$
$$p = ^{c_2}_{c_1}T[x, y, 1, 1]^T$$

Where $[x, y, 1]^T$ is a point on a view ray associated with the pixel (u,v), $K^{-1}$ is the inverse of the camera intrinsic matrix, and p represents a point in the camera coordinate system of the second camera pose 228.

In the step 278, a vector a parallel with the vector d is calculates as follows:

$$a = p[0:3] - ^{c_2}_{c_1}T[3, 0:3]$$

The vector d may be calculated in step 280 as follows:

$$d = a/\|a\|$$

The estimation ends in the step 282.

Figure 5:
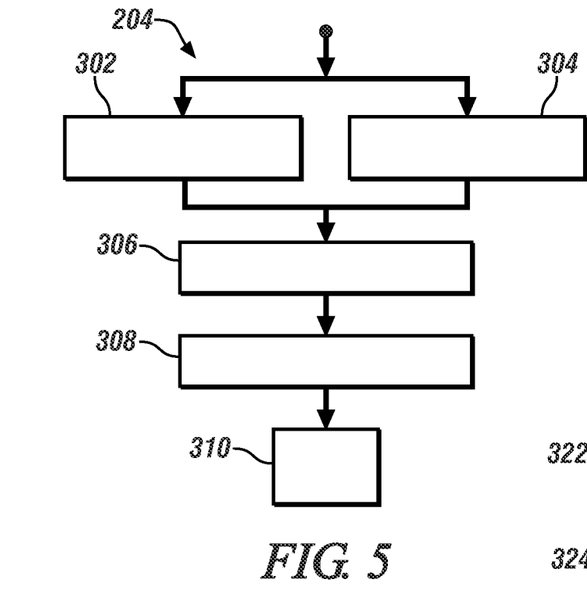
FIG. 5 is a flow diagram of a one-shot neural radiance field technique in accordance with one or more exemplary embodiments.
Figure 6:
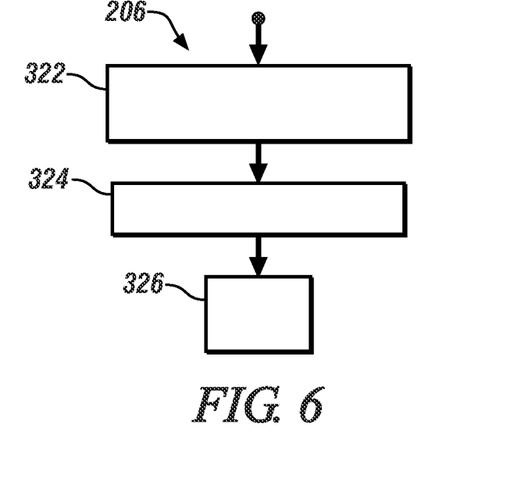
FIG. 6 is a flow diagram of a volume rendering in accordance with one or more exemplary embodiment.

Referring to FIG. 5, with reference back to FIGS. 1 and 2, a flow diagram of an example implementation of the one-shot neural radiance field technique of the step 204 is shown in accordance with one or more exemplary embodiments. The flow diagram in FIG. 5 and the flow diagram in FIG. 6 present an example implementation of the transfer function $f_2$. The step 204 generally includes steps 302 to 310, as illustrated. The sequence of steps is shown as a representative example. Other step orders may be implemented to meet the criteria of a particular application.

In the step 302, each three-dimensional point r(t) is sampled on the vector d as follows:

$$r(t) = ^{c_2}_{c_1}T[3, 0:3] + td$$

The step 304 may extract a feature W from the second image 184 using a deep neural network. In various embodiments, the step 302 and the step 304 may be performed in parallel. In some embodiments, the step 302 and the step 304 may be performed sequentially. A feature query W(πr(t)) may be performed in the step 306. The image-conditioned neural radiance field is generated in the step 308 as follows:

$$\sigma, c = f(\gamma(r(t)), d; W(\pi r(t)))$$

Where γ is a positional encoding on r(t). The one-shot neural radiance field technique may end in the step 310.

Referring to FIG. 6, with reference back to FIGS. 1 and 2, a flow diagram of an example implementation of the volume rendering of the step 206 is shown in accordance with one or more exemplary embodiments. The flow diagram of FIG. 6 and the flow diagram in FIG. 5 present an example implementation of the transfer function $f_2$. The step 206 generally includes steps 322 to 326, as illustrated. The sequence of steps is shown as a representative example. Other step orders may be implemented to meet the criteria of a particular application.

In the step 322, the computer 140 may perform an initial volume rendering by calculating C for each point r(t) in the rendered portion 242 as follows:

$$C(r) = \int_{t_n}^{t_f} T(t)\sigma(t)c(t)dt$$

Where $T(t) = \exp\left(-\int_{t_n}^{t} \sigma(s)ds\right)$.

Each pixel in the predicted image 224 may be concatenated in the step 324 to generate the predict image 224 $\hat{I}_1$ as follows:

$$\hat{I}_1 = \underset{u,v}{concat}C = \underset{u,v}{concat}f_2(f_1(u, v; ^w_vT_1, ^w_vT_2, ^v_cT); I_2)$$

The volume rendering ends with the step 326.

The alignment parameters may be optimized in the step 208 to achieve minimum differences between the predicted images 224 and corresponding first images 182. In various embodiments, a loss function may be implemented for the minimization. The loss function is generally based on differences between multiple predicted images 224 and multiple first images 182 in a time window for maturation (e.g., averaging, consensus, and the like). In various embodiments, pixel comparisons may be implemented as follows:

$$L(^e_pT_1, ^e_pT_2, \ldots, ^e_pT_n, ^p_cT) = \underset{k}{\text{maturation}}\|\hat{I}_k - I_k\|$$

Where $\hat{I}_k$ is the predicted image 224 and $I_k$ is the first image 182. In other embodiments, feature comparisons may be performed to optimize. Various feature comparisons may be explicit features that include, but are not limited to, Harris corner, Scale Invariant Feature Transform (SIFT), Speeded Up Robust Feature (SURF), Kaze, and SuperPoints. The explicit feature comparisons may be implemented as follows:

$$L(^e_pT_1, ^e_pT_2, \ldots, ^e_pT_n, ^p_cT) = \underset{k}{\text{maturation}}\|D(\hat{I}_k) - D(I_k)\|$$

Where D is the feature descriptor function to extract features from the images. In some embodiments, the feature comparisons may be implicit feature, such as Siamese neural network. The implicit feature comparisons may be implemented as follows:

$$L({}^e_pT_1, {}^e_pT_2, \ldots, {}^e_pT_n, {}^p_cT) = \underset{k}{\text{maturation}}\, S(\hat{I}_k, I_k)$$

Where S is a neural network model determining the similarity between two images.

In some designs, the minimization may be based on optimization. The optimization may be based solely on alignment as follows:

$${}^p_cT^* = \underset{{}^p_cT}{\text{argmin}} L({}^e_pT_1, {}^e_pT_2, \ldots, {}^e_pT_n, {}^p_cT)$$

In other designs, the alignment with localization may be implemented as follows:

$${}^e_pT_1^*, {}^e_pT_2^*, \ldots, {}^e_pT_n^*, {}^p_cT^* = \underset{{}^e_pT_1, {}^e_pT_2, \ldots, {}^e_pT_n, {}^p_cT}{\text{argmin}} L({}^e_pT_1, {}^e_pT_2, \ldots, {}^e_pT_n, {}^p_cT)$$

Such that $\text{constr}({}^e_pT_1, {}^e_pT_2, \ldots, {}^e_pT_n) < \delta$.

Embodiments of the system include loading navigation data and select images into the computer. A check for image feature sufficiency and maneuver degeneracy conditions is performed. The vehicle poses and initial alignment may be used to calculate the view direction of the predicted image. A camera pose transform from the vehicle poses and the initial alignment is calculated. For any given pixel in the predicted image, the view direction is calculated in the coordinates of the given image.

A one-shot NeRF is used to generate a rendered portion of the environment from the second image. Volume rendering is used to generate a predicted image. Three-dimensional points on view rays through the rendered portion of the environment may be sampled. Features are extracted from the given image. Features are subsequently queried using the sampled three-dimensional points. A color and density of each three-dimensional point on each view ray are generated. Visual rendering is used to integrate the color and density on the same ray to predict the color of a pixel in the predicted image.

The alignment parameters may be optimized to achieve minimum differences between the predicted images and corresponding first images. Loss functions based on differences between the predicted images and the first images may be based on color difference of each pixel, two-dimensional position differences of each pair of features, explicit features such as Harris corner, SIFT, SURF, Kaze, SuperPoints, etc., implicit features such as Siamese neural networks.

Maturation within a time window may be performed to smooth the adjustment to the alignment parameters. The maturation techniques may include, but are limited to, mean, medium, Random Sample Consensus (RANSAC), M-estimator Sample Consensus (MSAC), and the like. Optimization may be performed in some cases to minimize the loss function. For a given vehicle pose, the optimization may be limited to camera-to-platform alignment. The alignment may be optimized with the platform/vehicle pose, subject to vehicle pose constraints using B-spline, graph model, etc.

The alignment parameters are updated, and a coordinate transformation matrix is generated. The updated alignment parameters may be stored in a calibration memory. The updated alignment parameters may also be published to other circuits within a vehicle to apply the alignment parameters while analyzing and processing the video images.

Embodiments of the disclosure generally provide a system including a platform, a navigation system, a camera, and a computer. The platform is operational to move through an environment. The navigation system is mounted to the platform, and is operational to measure a plurality of platform poses of the platform in the environment. The camera is mounted to the platform and is operational to generate multiple images of the environment at multiple timestamps. The computer is mounted to the platform, and is operational to receive a first image from the camera, where the first image is taken from a first camera pose relative to the environment at a first timestamp of the plurality of timestamps, and receive a second image from the camera, where the second image is taken from a second camera pose relative to the environment at a second timestamp of the plurality of timestamps, and the second timestamp is different than the first timestamp.

The computer is further operational to: estimate a view direction of the first camera pose based on a first platform pose of the plurality of platform poses at the first timestamp, a second platform pose of the plurality of platform poses at the second timestamp, and a plurality of alignment parameters of the camera relative to the platform; generate a rendered portion of the environment with a neural radiance field technique based on the second image and the plurality of alignment parameters; generate a predicted image of the environment as observed along the view direction through the rendered portion of the environment; determine one or more differences between the first image and the predicted image; and update one or more of the plurality of alignment parameters based on the one or more differences.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A system comprising:
   a platform operational to move through an environment;
   a navigation system mounted to the platform, and operational to measure a plurality of platform poses of the platform in the environment;
   a camera mounted to the platform and operational to generate a plurality of images of the environment at a plurality of timestamps; and a computer mounted to the platform, and operational to:
receive a first image of the plurality of images from the camera, wherein the first image is taken from a first camera pose relative to the environment at a first timestamp of the plurality of timestamps;
receive a second image of the plurality of images from the camera, wherein the second image is taken from a second camera pose relative to the environment at a second timestamp of the plurality of timestamps, and the second timestamp is different than the first timestamp;
estimate a view direction of the first camera pose based on a first platform pose of the plurality of platform poses at the first timestamp, a second platform pose of the plurality of platform poses at the second timestamp, and a plurality of alignment parameters of the camera relative to the platform;
generate a rendered portion of the environment with a neural radiance field technique based on the second image and the plurality of alignment parameters;
generate a predicted image of the environment as observed along the view direction through the rendered portion of the environment;
determine one or more differences between the first image and the predicted image; and
update one or more of the plurality of alignment parameters based on the one or more differences.

2. The system according to claim 1, wherein:
the generation of the rendered portion includes generation of an image-conditioned neural radiance field based solely on the second image; and
the generation of the predicted image is based on the rendered portion with a volume rendering of the image-conditioned neural radiance field.

3. The system according to claim 1, wherein the computer is further operational to:
determine one or more maneuver degeneracy conditions of the platform prior to utilizing the plurality of platform poses, wherein the estimation of the view direction is further based on the one or more maneuver degeneracy conditions.

4. The system according to claim 3, wherein the computer is further operational to:
determine one or more image enabling conditions prior to utilizing the second image, wherein the generation of the rendered portion is further based on the one or more image enabling conditions.

5. The system according to claim 1, wherein the computer is further operational to:
determine one or more alignment parameters as a reduction of a loss function based on a plurality of differences between the first image and the predicted image.

6. The system according to claim 5, wherein the loss function is based on one or more of a color difference, a two-dimensional position difference of one or more pairs of features, and a maturation of multiple ones of the plurality of images within a time window.

7. The system according to claim 5, wherein the reduction of the loss function further includes aligning of a camera coordinate system of the camera with a platform coordinate system of the platform.

8. The system according to claim 7, wherein the reduction of the loss function includes a localization of the platform over multiple ones of the plurality of platform poses.

9. The system according to claim 1, wherein the platform forms part of one or more of a land vehicle, a water vehicle, and an air vehicle.

10. A method for neural radiance field based camera alignment comprising:
measuring a plurality of platform poses of a platform in an environment with a navigation system;
generating a plurality of images of the environment at a plurality of timestamps with a camera mounted to the platform;
receiving at a computer a first image of the plurality of images from the camera, wherein the first image is taken from a first camera pose relative to the environment at a first timestamp of the plurality of timestamps;
receiving at the computer a second image of the plurality of images from the camera, wherein the second image is taken from a second camera pose relative to the environment at a second timestamp of the plurality of timestamps, and the second timestamp is different than the first timestamp;
estimating a view direction of the first camera pose based on a first platform pose of the plurality of platform poses at the first timestamp, a second platform pose of the plurality of platform poses at the second timestamp, and a plurality of alignment parameters of the camera relative to the platform;
generating a rendered portion of the environment with a neural radiance field technique based on the second image and the plurality of alignment parameters;
generating a predicted image of the environment as observed along the view direction through the rendered portion of the environment;
determining one or more differences between the first image and the predicted image; and
updating one or more of the plurality of alignment parameters based on the one or more differences.

11. The method according to claim 10, wherein:
the generating of the rendered portion includes generating an image-conditioned neural radiance field based solely on the second image; and
the generating of the predicted image is based on the rendered portion with a volume rendering of the image-conditioned neural radiance field.

12. The method according to claim 10, further comprising:
determining one or more maneuver degeneracy conditions of the platform prior to utilizing the plurality of platform poses, wherein the estimating of the view direction is further based on the one or more maneuver degeneracy conditions.

13. The method according to claim 12, further comprising:
determining one or more image enabling conditions prior to utilizing of the second image, wherein the generating of the rendered portion is further based on the one or more image enabling conditions.

14. The method according to claim 10, further comprising:
determining of one or more alignment parameters as a reduction of a loss function based on a plurality of differences between the first image and the predicted image.

15. The method according to claim 14, wherein the loss function is based on one or more of a color difference, a two-dimensional position difference of one or more pairs of features, and a maturation of multiple ones of the plurality of images within a time window.

16. The method according to claim 14, wherein the reducing of the loss function is aligning of a camera coordinate system of the camera with a platform coordinate system of the platform.

17. The method according to claim 16, wherein the reducing of the loss function includes localizing the platform over multiple ones of the plurality of platform poses.

18. A vehicle comprising:
a navigation system operational to measure a plurality of vehicle poses of the vehicle in an environment;
a camera operational to generate a plurality of images of the environment at a plurality of timestamps; and
a computer operational to:
receive a first image of the plurality of images from the camera, wherein the first image is taken from a first camera pose relative to the environment at a first timestamp of the plurality of timestamps;
receive a second image of the plurality of images from the camera, wherein the second image is taken from a second camera pose relative to the environment at a second timestamp of the plurality of timestamps, and the second timestamp is different than the first timestamp;
estimate a view direction of the first camera pose based on a first vehicle pose of the plurality of vehicle poses at the first timestamp, a second vehicle pose of the plurality of vehicle poses at the second timestamp, and a plurality of alignment parameters of the camera relative to the vehicle;
generate a rendered portion of the environment with a neural radiance field technique based on the second image and the plurality of alignment parameters;
generate a predicted image of the environment as observed along the view direction through the rendered portion of the environment;
determine one or more differences between the first image and the predicted image; and
update one or more of the plurality of alignment parameters based on the one or more differences.

19. The vehicle according to claim 18, further comprising:
circuitry coupled to the computer, and operational to utilize the plurality of alignment parameters and the plurality of images.

20. The vehicle according to claim 19, wherein the circuitry is operational to perform one or more automatic driving functions based on the plurality of alignment parameters and the plurality of images.

* * * * *